(12) United States Patent
Takahara

(10) Patent No.: US 6,765,648 B2
(45) Date of Patent: Jul. 20, 2004

(54) IMAGE SENSOR UNIT AND IMAGE READER USING THE SAME

(75) Inventor: Hiroyuki Takahara, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/892,409

(22) Filed: Jun. 28, 2001

(65) Prior Publication Data

US 2001/0043371 A1 Nov. 22, 2001

Related U.S. Application Data

(62) Division of application No. 09/203,510, filed on Dec. 1, 1998, now Pat. No. 6,285,441.

(30) Foreign Application Priority Data

Dec. 3, 1997 (JP) .............................................. 9-332891

(51) Int. Cl.[7] ........................ G03B 27/54; G03B 27/74; G03G 15/00; H04N 1/04; A47G 19/08

(52) U.S. Cl. ............................. 355/67; 355/68; 355/69; 399/118; 358/474; 211/41.17; 211/41.18

(58) Field of Search ............................. 355/67, 68, 69; 399/118; 358/474; 211/41.17, 41.18

(56) References Cited

U.S. PATENT DOCUMENTS

| 4,398,690 | A | * | 8/1983 | Rutledge |
| 4,444,318 | A | * | 4/1984 | Alexander |
| 5,592,746 | A | * | 1/1997 | Ternes |
| 5,900,951 | A | * | 5/1999 | Tsai |
| 6,072,602 | A | * | 6/2000 | Sun et al. |

* cited by examiner

Primary Examiner—Frank G. Font
Assistant Examiner—Khaled Brown
(74) Attorney, Agent, or Firm—Fitzpatrick, Cella, Harper & Scinto

(57) ABSTRACT

An image reader for optically reading an image on an original and an image sensor unit for mounting to the image reader. The image sensor unit is provided with a shaft used for rotatably mounting the image sensor unit to an image sensor unit holding member of the image reader. This reduces the size of the image reader.

11 Claims, 19 Drawing Sheets

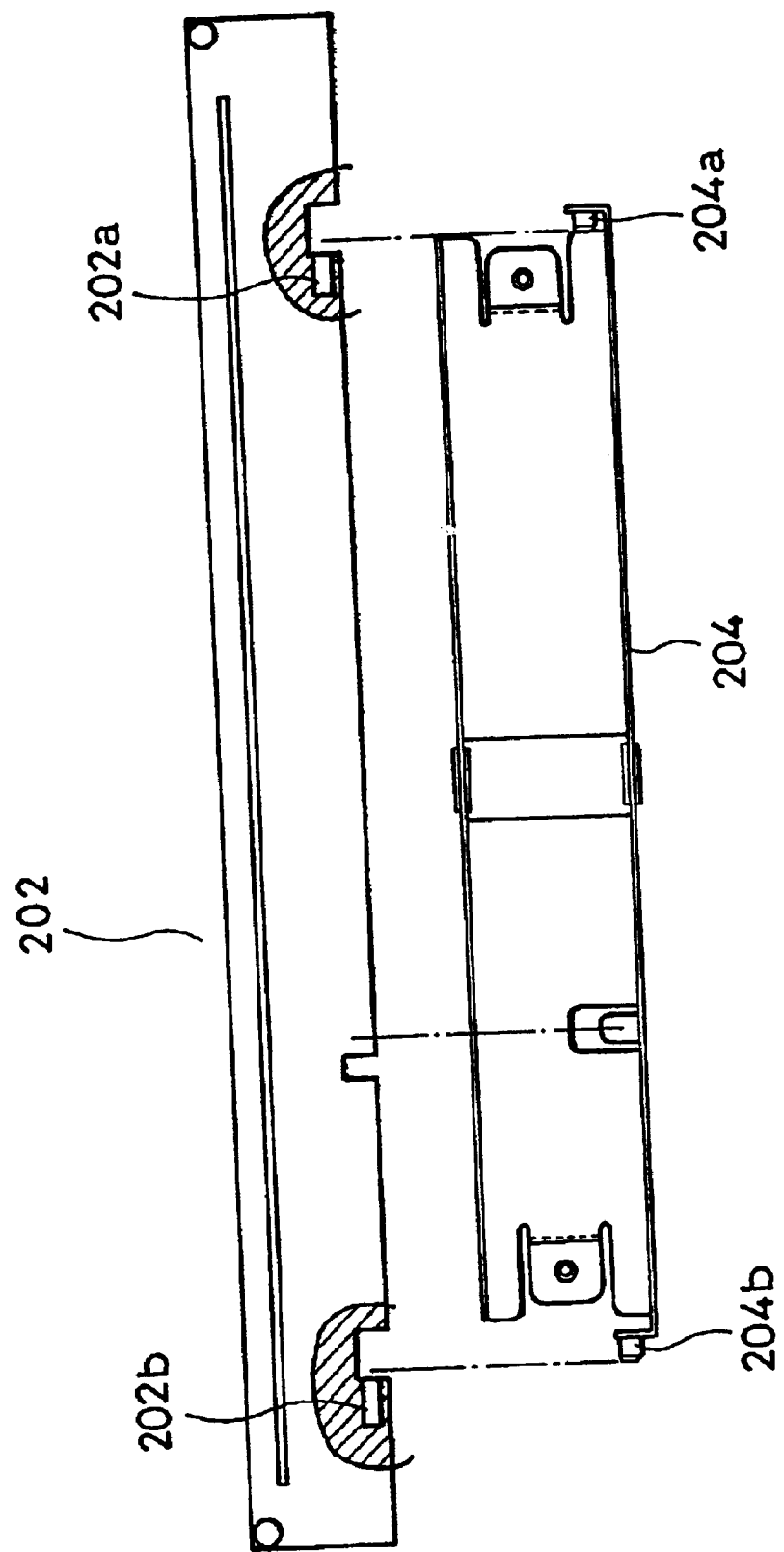

IMAGE SENSOR UNIT AND IMAGE READER USING THE SAME

This application is a division of application Ser. No. 09/203,510, filed Dec. 1, 1998 now U.S. Pat. No. 6,285,441.

BACKGROUND OF THE INVENTION

1. Field of the Invention

The present invention relates to an image sensor unit and an image reader capable of reading image information, such as an image scanner, a facsimile, or a copying machine.

2. Description of the Related Art

Hitherto, various types of devices capable of reading an image, such as an image scanner, a facsimile, and a copying machine, have been proposed. There is, for example, one type having a relatively simple structure. In the structure, an image sensor unit, which can detect an image occupying up to the entire width of an original, is disposed parallel to an original-holding glass member. The image sensor unit is moved by an amount equal to the length of the original in order to scan the entire surface of the original. Various types of image sensor units have also been, hitherto, proposed. In one main type of image sensor unit, the original is illuminated by an illuminating member with a size equal to the width of the original. The light, reflected from the original, is guided to an image-focusing lens by a mirror in order to focus an image, which is reduced in size, on a line sensor, such as a charge-coupled device (CCD). In another main type of image sensor unit, the original is similarly illuminated by a light-emitting diode (LED) or the like. The light, reflected from the original is focused, with a magnification of 1x, on a light-receiving surface of the line sensor with a length equal to the width of the original, by a selfoc lens.

A description will now be given of a conventional image reader and an image sensor unit thereof, with reference to FIGS. 16 to 19. FIG. 16 is a front view of the conventional image reader. FIG. 17 illustrates the conventional image reader, as viewed from above the conventional image reader. FIG. 18 is an enlarged front view of the main portion of the conventional image reader. FIG. 19 illustrates the image sensor unit of the conventional image reader.

In the image reader, an original-holding glass member 101, for placing thereon an original, is disposed at the top portion of the body of the image reader. A line sensor unit 102, serving as an image sensor unit for reading the image on the original, is disposed below the original-holding glass member 101. The line sensor unit 102 comprises component parts that are integrally formed together into a unit. They are a light-emitting diode (LED) for illuminating an original; a selfoc lens array for focusing an image light reflected from the original illuminated by the light-emitting diode; and an optical sensor element for converting the image focused by the selfoc lens array into electrical signals. The line sensor unit 102 is secured to a sensor-holding frame 103 with screws, after positioning the line sensor unit 102 and the sensor-holding frame 103 by fitting pins 102a and 102b, at the bottom surface of a housing of the line sensor unit 102, into respective holes in the sensor-holding frame 103. The sensor-holding frame 103 is rotatably held by a moving holding frame 104, after fitting holes 104a and 104b, disposed at both ends of the moving holding frame 104, onto rotational shaft portions 103a and 103b, disposed at both ends of the sensor-holding frame 103 in a longitudinal direction thereof. The positioning of the sensor-holding frame 103 and the moving holding frame 104, in the longitudinal direction of the line sensor unit 102, is achieved by fitting a protrusion 103c of the sensor-holding frame 103 to a groove 104c in the moving holding frame 104. The moving holding frame 104 is guided by a guide bar 106 affixed to a body base 105. Coil springs 107a and 107b are provided at the sensor-holding frame 104, and bias the sensor-holding frame 103 towards the original-holding glass member 101. Two sliding protrusions 120a and 120b are affixed to the sensor-holding frame 103. The distance between the line sensor unit 102 and the original-holding glass member 101 is maintained by the sliding protrusions 120a and 120b that are in contact with the original-holding glass member 101. Such a structure, in which sliding protrusions are in contact with an original-holding glass member, is particularly suitable for use in small image sensor units with a small depth of field, and allows the distance between the original-holding glass member and the protrusions to be maintained with a relatively high precision. The driving of the moving holding frame 104 is achieved by causing a motor 109, an idler gear 121, and an idler gear 122 to drive a belt 112 and a pair of pulleys 110 and 111, and by linking one portion of the belt 112 to the moving holding frame 104. The belt 112 and the pair of pulleys 110 and 111 are provided at the body of the image reader in the direction of movement of the moving holding frame 104. The motor 109 is affixed to the body of the image reader.

The above-described conventional image sensor unit is a substantially rectangular parallelepipedic unit. In order to form the above-described high-precision supporting structure for the image sensor unit 102, the image sensor unit 102 is temporarily secured to the sensor-holding frame 103; a rotary mechanism is provided between the sensor holding frame 103 and the moving holding frame 104; a sliding protrusion is formed on the sensor holding frame 103 and a member, for positioning the image sensor unit 102 in the longitudinal direction thereof, is provided between the sensor-holding frame 103 and the moving holding frame 104. Therefore, when such a conventional image sensor unit is used in an image reader, a large space must be provided around the image sensor unit, thereby increasing the size of the image reader. In addition, a sensor-holding member is required, thereby increasing costs. Further, since part tolerances accumulate during incorporation of the image sensor unit into the image reader, the precision of the image reader is reduced accordingly.

SUMMARY OF THE INVENTION

In view of the above-described problems, it is an object of the present invention to provide a small image reader.

It is another object of the present invention to provide an image reader capable of performing reading operations with high precision.

It is still another object of the present invention to provide an image sensor unit comprising a light source for illuminating an original; a reading element for reading an image on the original; and a housing for supporting the light source and the reading element, the housing having a shaft or a bearing for allowing rotation of the housing, the shaft or the bearing being disposed so as to be parallel to the reading element.

It is still another object of the present invention to provide an image reader comprising an original-holding plate; an image sensor unit including a light source for illuminating an original, a reading element for reading an image on the original, and a housing with either a shaft or a bearing for allowing rotation of the image sensor unit; and a holding member for holding the image sensor unit, the holding member having either a bearing or a shaft for engaging the shaft or the bearing of the image sensor unit.

Further objects, features and advantages of the present invention will become apparent from the following description of the preferred embodiments with reference to the attached drawings.

BRIEF DESCRIPTION OF THE DRAWINGS

FIG. 8 illustrates the image sensor unit and the unit-holding member, in a second embodiment of the present invention.

DESCRIPTION OF THE PREFERRED EMBODIMENTS

Figure 1:
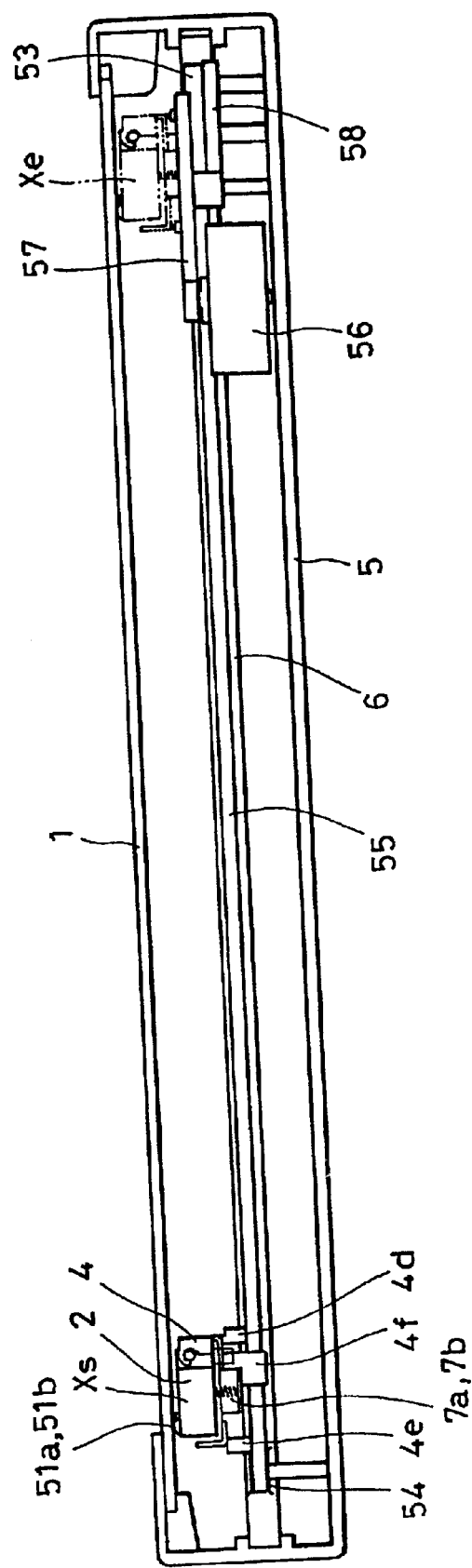
FIG. 1 is a front view of a first embodiment of the image reader in accordance with the present invention.
Figure 2:
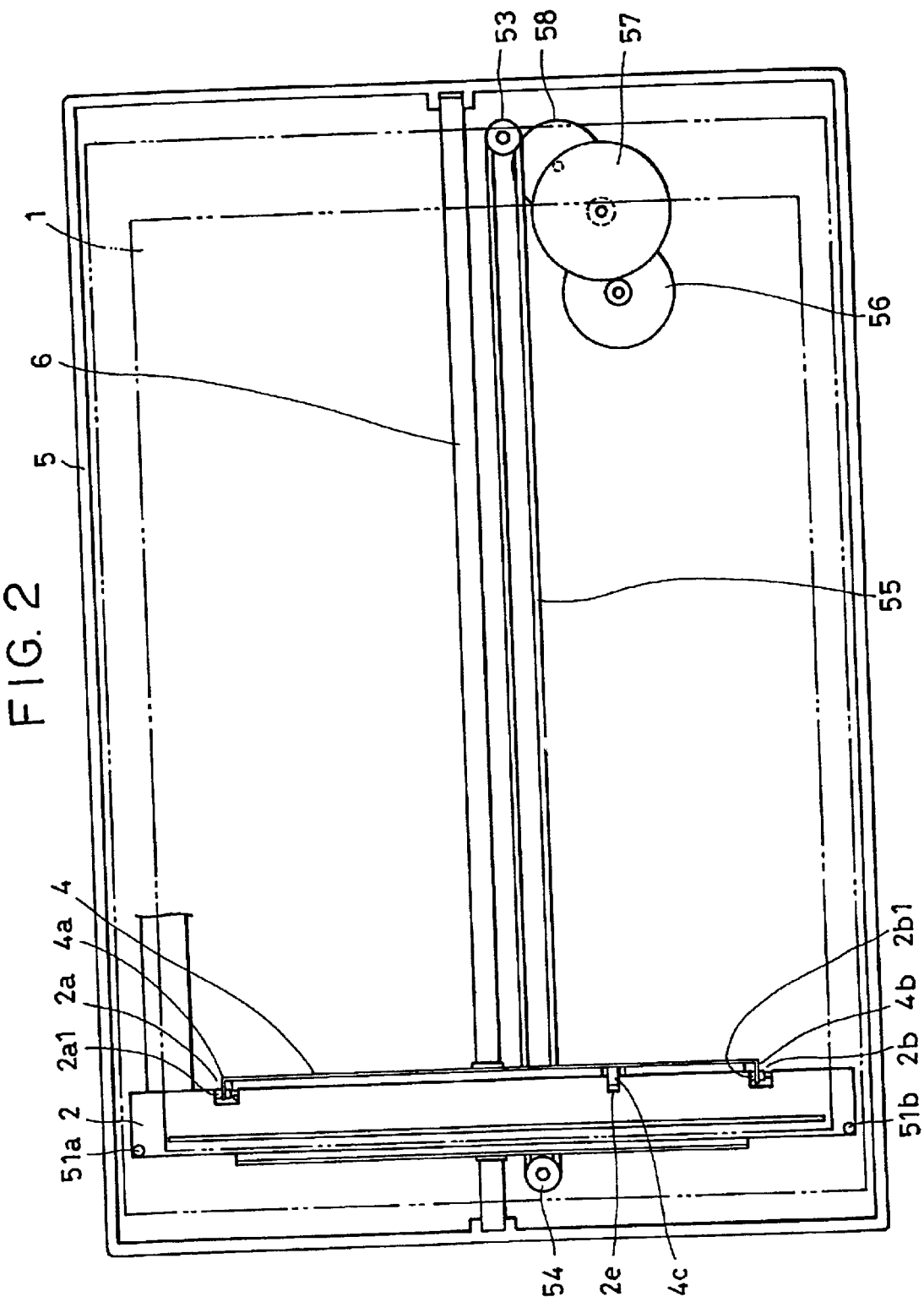
FIG. 2 illustrates the first embodiment of the image reader in accordance with the present invention, as viewed from the top side.
Figure 3:
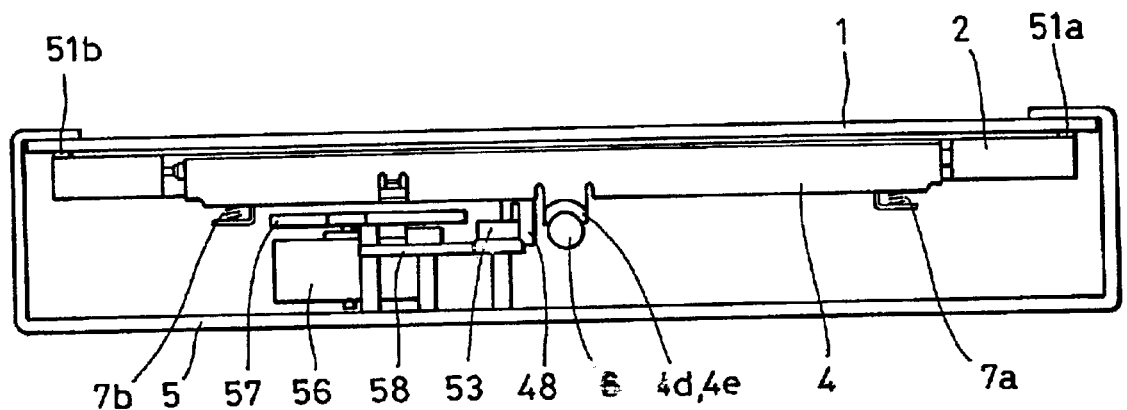
FIG. 3 is a right side view of the first embodiment of the image reader in accordance with the present invention.
Figure 4:
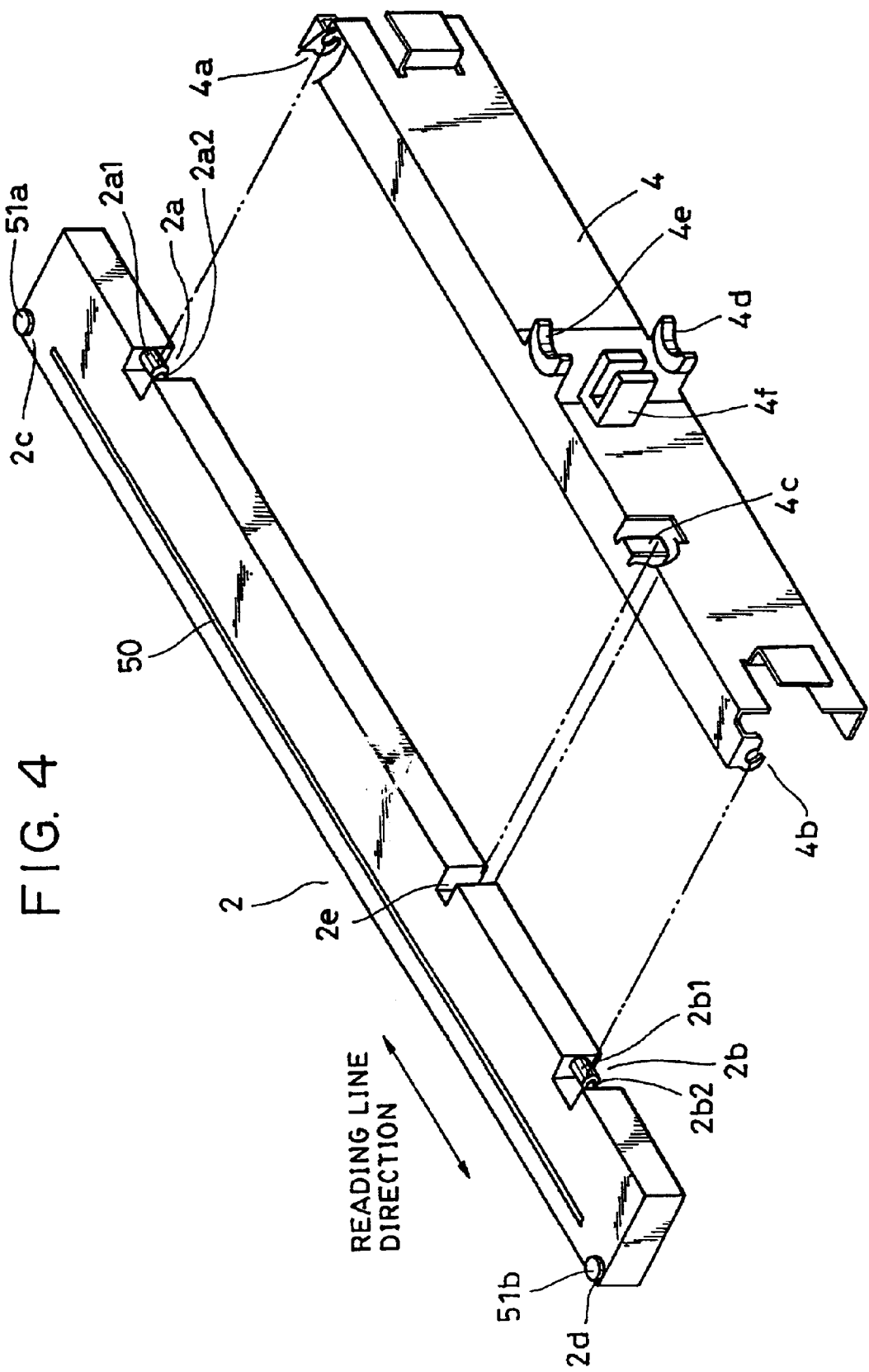
FIG. 4 is a perspective view of the image sensor unit and the unit-holding member, in the first embodiment of the present invention.
Figure 5:
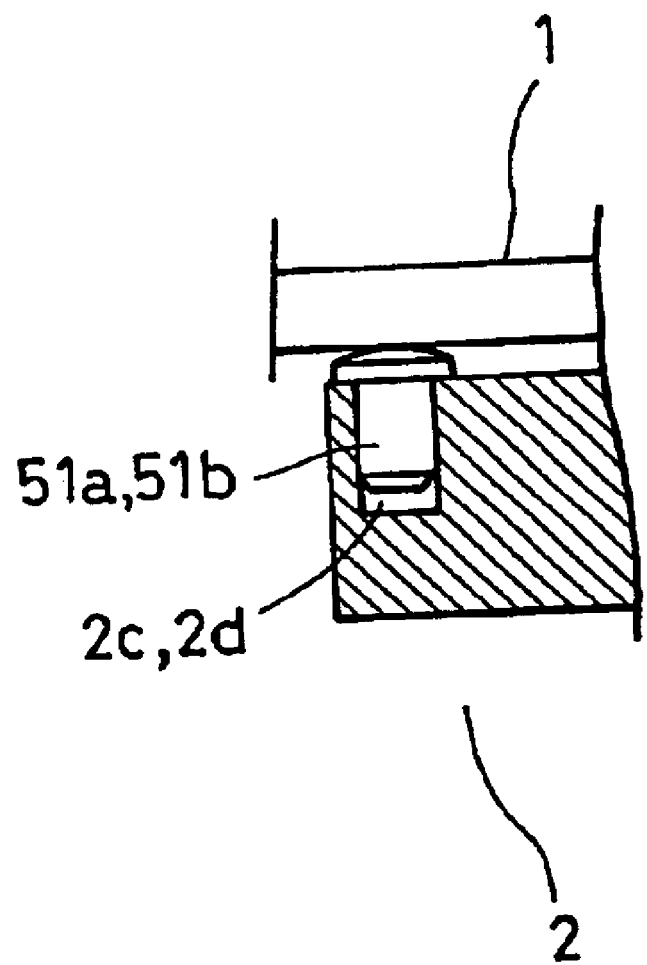
FIG. 5 is a sectional view of the main portion of the first embodiment of the image reader in accordance with the present invention.

A description will now be given of the first embodiment of the present invention, with specific reference to FIGS. 1 to 7. FIG. 1 is a front view of the image reader. FIG. 2 illustrates the image reader, as viewed from above the image reader. FIG. 3 is a right side view of the image reader. FIG. 4 is a perspective view of the image sensor unit and the unit-holding member. FIG. 5 is a sectional view of the main portion of the image reader. FIGS. 6A to 6C and FIGS. 7A and 7B illustrate the steps of assembling the image sensor unit and the unit holding member. In the first embodiment, a computer or the like captures an image on an original through an image scanner.

An original-holding glass member 1, for placing thereon an original, is provided above the body of an image scanner. A line sensor unit 2, being an image sensor unit for reading an image of an original, is disposed below the original-holding glass member 1. The line sensor unit 2 includes component parts which are integrally formed into a unit. They are a light source, such as a light-emitting diode (LED), for illuminating an original; a selfoc lens array 50 for focusing an image light reflected from the original illuminated by the light-emitting diode; and an optical sensor element for converting the image, focused by the selfoc lens array, into electrical signals. The light-emitting diode, the selfoc lens array, and the optical sensor element contact and are secured, with an adhesive or the like, to a positioning portion provided at the housing of the line sensor unit 2. The housing of the line sensor unit 2 is formed by molding a resinous material such as plastic. The reading width of the line sensor unit 2 is equal to the width of the original. The line sensor unit 2 captures one line of image information. The housing of the line sensor unit 2 has two shafts 2a and 2b for allowing rotation of the line sensor unit 2, with the center line of the shafts 2a and 2b lying in a direction which is substantially parallel to the reading line direction (indicated in FIG. 4). The shaft 2a has a fitting portion 2a1 and an insertion portion 2a2, while the shaft 2b has a fitting portion 2b1 and an insertion portion 2b2. The fitting portions 2a1 and 2b1 have large diameters, while the insertion portions 2a2 and 2b2 have small diameters. The shafts 2a and 2b are provided so as to fit into recessed portions in the outer periphery of the line sensor unit 2, being rectangular parallelpiped in form. Round holes 2c and 2d are provided at both ends of the line sensor unit 2, as shown in the cross sectional view of FIG. 5. Spacers 51a and 51b, made of a resinous material with good slidability, are inserted into the round holes 2c and 2d, respectively. These spacers 51a and 51b contact the original-holding glass member 1. The line sensor unit 2 is rotatably held by a unit-holding member 4, by fitting holes (bearings for allowing rotation), disposed at both ends of the unit-holding member 4, onto fitting portions 2a1 and 2b1, disposed at the line sensor unit 2. The edges of the holes 4a and 4b are partly cut off. A groove 2e, whose widthwise direction lies in the reading line direction, is formed in the line sensor unit 2. A protrusion 4c, whose widthwise direction also lies in the reading line direction, of the unit-holding member 4 is fitted into the groove 2e of the line sensor unit 2 in order to position the line sensor unit 2 and the unit-holding member 4.

Figure 6A:
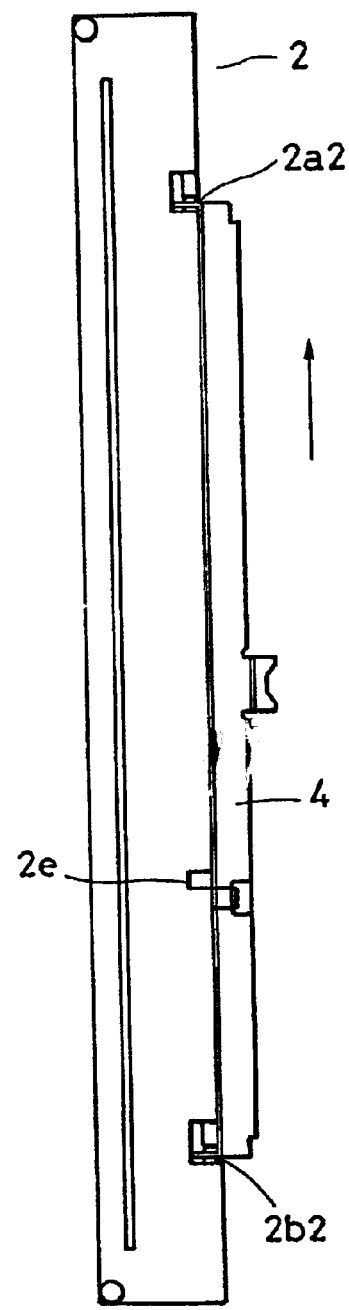
FIGS. 6A, 6B, and 6C illustrate the steps of assembling the image sensor unit and the unit-holding member, in the first embodiment of the present invention.

A description will now be given of how to assemble the line sensor unit 2 and the unit-holding unit 4, in the first embodiment, with specific reference to FIGS. 6 and 7. First, as shown in FIG. 6A, the holes 4a and 4b of the unit-holding member 4 are inserted onto the corresponding insertion portions 2a2 and 2b2 of the line sensor unit 2, from the partly cut out edges of the holes 4a and 4b, as shown in FIG. 7A. At this point, the protrusion 4c of the unit-holding member 4 does not engage the groove 2e in the line sensor unit 2, as indicated by the alternate long and two short dash line in FIG. 7B. In addition, they are not aligned in the longitudinal direction of the line sensor unit 2, as shown in FIG. 6A.

Figure 6B:
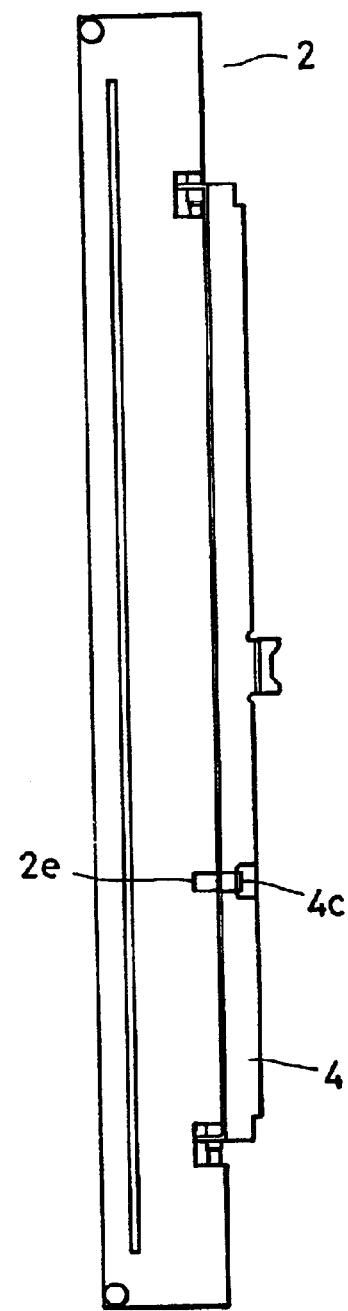
Figure 6C:
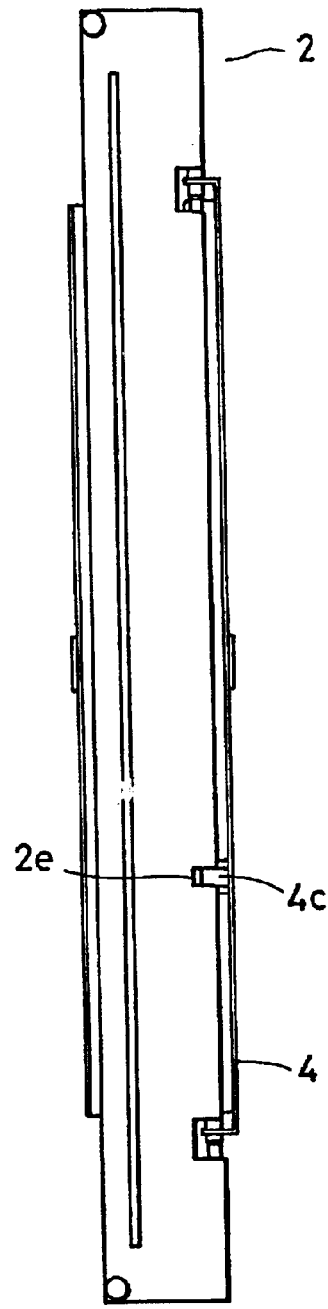
Figure 7A:
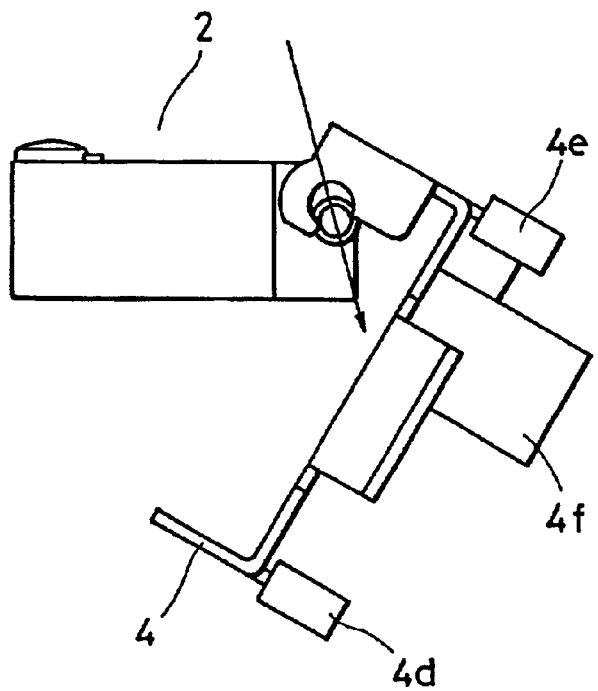
FIGS. 7A and 7B illustrate the steps of assembling the image sensor unit and the unit-holding member, in the first embodiment of the present invention.
Figure 7B:
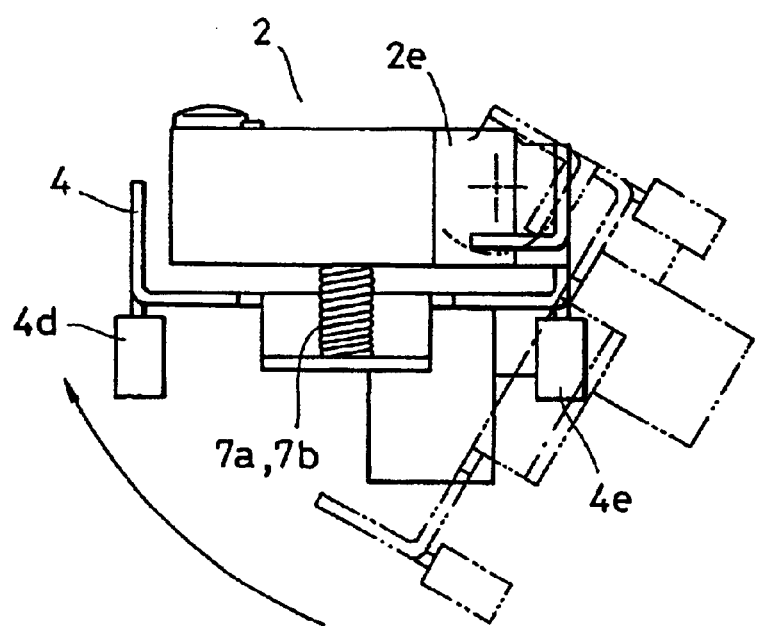

Then, as shown in FIG. 6B, the unit-holding member 4 is moved in the direction of the arrow. This causes the holes 4a and 4b in the unit-holding member 4 to be rotatably fitted onto the larger diameter fitting portions 2a1 and 2a2 of the line sensor unit 2, respectively. This causes the protrusion 4c of the unit-holding member 4 to be aligned with the groove 2e of the line sensor unit 2, in the longitudinal direction of the line sensor unit 2, as shown in FIG. 6B. In this condition, when the unit-holding member 4 is rotated in the direction of the arrow of FIG. 7B, the unit-holding member 4 arrives at the position indicated by the solid line of FIG. 7B, whereby the protrusion 4c of the unit-holding member 4 engages the groove 2e of the line sensor unit 2 in order to define the positions of the line sensor unit 2 and the unit-holding member 4 in the reading line direction. Accordingly, unlike in conventional image readers, the line sensor unit 2 can be directly mounted to the unit-holding member 4, without using other component parts. Sliding portions 4d and 4e, which are made of a resinous material with good slidability and which have a V-shaped inclined surface, are integrally formed on the unit-holding member 4. When the unit-holding member 4 is guided along a round guide bar 6, the V-shaped inclined surfaces of the two sliding portions 4d and 4e of the unit-holding member 4 are in contact with the round guide bar 6. In order to drive the image reading portion, being guided in such a manner, for performing scanning operations, drive pulleys 53 and 54 are provided on a body base 5, and a drive belt 55 is stretched therebetween. A portion of the drive belt 55 is affixed to a belt-gripping portion 4f at the bottom surface of the unit-holding member 4. A drive motor 56 is provided at the body base 5, with the driving power of the drive motor 56 being transmitted to the drive pulley 54 through the idler gears 57 and 58.

A description will now be given of the operation of the image scanner in the present embodiment.

An original whose image is to be read is set on the original-holding glass member 1, with the surface from which an image is to be read being faced down on the original-holding glass member 1. When the power supply of the image scanner is in an on state, the line sensor unit 2 is driven at the image reading starting position Xs and stays there. When an image scanning start signal is input to the image scanner from, for example, a computer (not shown), the line sensor unit 2 starts to take in image information of the original. At the same time, the drive motor is driven to run the belt 55 in the direction of the guide bar 6, causing the line sensor unit 2 and the unit-holding member 4 affixed to the belt 55 to be integrally driven. During the running of the belt 55, the line sensor unit 2 is biased towards the original-holding glass member 1 by coil springs 7a and 7b, so that the spacers 51a and 51b, affixed to the line sensor unit 2, are in contact with the original-holding glass member 1, whereby the distance between the line sensor unit 2 and the original-holding glass member 1 is maintained. With the distance between the line sensor unit 2 and the original-holding glass member 1 maintained, scanning of the surface of the original is performed. This allows the line sensor unit 2 to read the image on the surface of the original, with the image kept in focus and the image quality kept at a high level. On the other hand, the unit-holding member 4 is biased towards the guide bar 6 by the reaction force of the coil springs 7a and 7b. This biasing force ensures positioning of the V-shaped inclined surfaces of the unit-holding member 4 on the guide bar 6, so that the unit-holding member 4 is guided on the guide bar 6 without rattling.

While capturing image information, the line sensor unit is driven to the image capturing terminal position Xe, and the computer captures the entire image on the original. After the image has been read, the driving motor 56 rotates in the reverse direction to move the line sensor unit back to the image reading starting position Xs. Accordingly, in the present embodiment, the line sensor unit 2 can be directly supported by the unit-holding member 4 without using a sensor holding frame employed in conventional image readers. Therefore, a smaller, cheaper, and high-precision image reader can be designed.

A description will now be given of a second embodiment of the image reader in accordance with the present invention. The structure and operation of the image reader of the second embodiment is essentially the same as those of the image reader of the first embodiment, except that a line sensor unit 202 is used instead of the line sensor unit 2 and a unit-holding member 204 is used instead of the unit-holding member 4. Therefore, only the line sensor unit 202 and the unit-holding member 204 are described below. FIG. 8 illustrates the line sensor unit 202 and the unit-holding 204, in the second embodiment of the present invention. The structure of the line sensor unit 202 in the second embodiment is essentially the same as the structure of the line sensor unit 2, except that the line sensor unit 202 has holes 202a and 202b instead of shafts 2a and 2b formed at the housing of the line sensor unit 2. The holes 202a and 202b are formed substantially parallel to the reading line direction. The structure of the unit-holding member 204 in the second embodiment is essentially the same as the structure of the unit-holding member 4, except that the unit-holding member 4 has two shafts 204a and 204b instead of two holes 4a and 4b. In the present embodiment, the line sensor unit 202 and the unit-holding member 204 are made rotatable with respect to each other by fitting the shafts 204a and 204b of the unit-holding member 204 into the holes 202a and 202b in the line sensor unit 202. The line sensor unit 202 and the unit-holding member 204 are assembled in exactly the same way by following the procedures illustrated in FIGS. 6A to 6C and FIGS. 7A and 7B.

Figure 9:
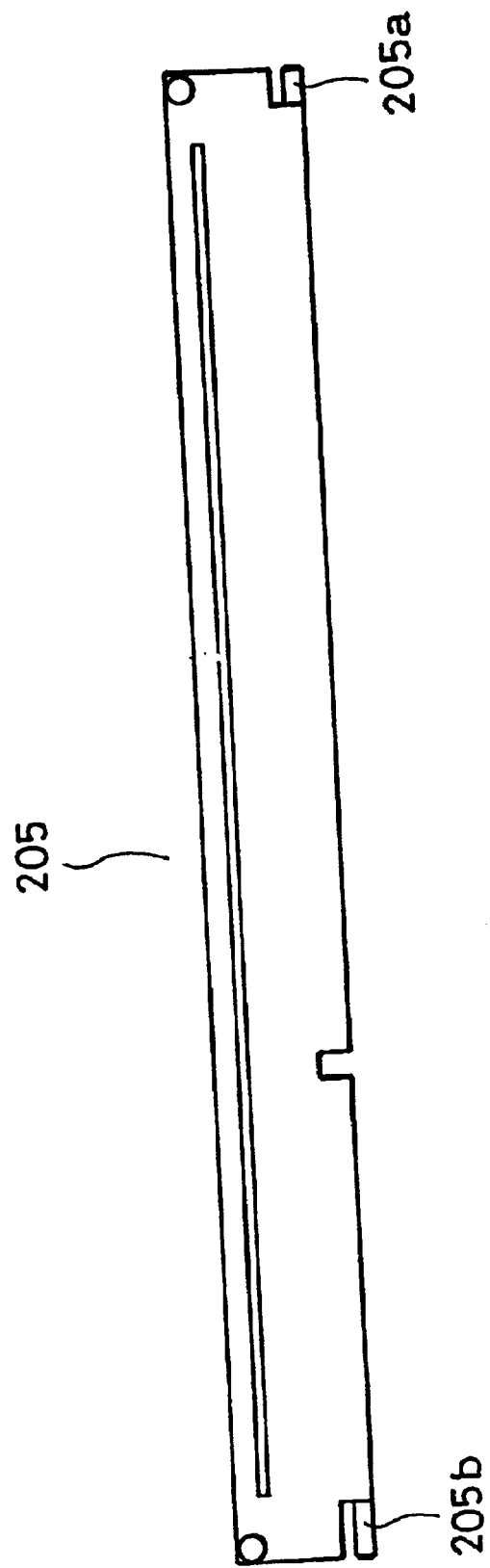
FIG. 9 illustrates the line sensor unit, in a third embodiment of the present invention.
Figure 10:
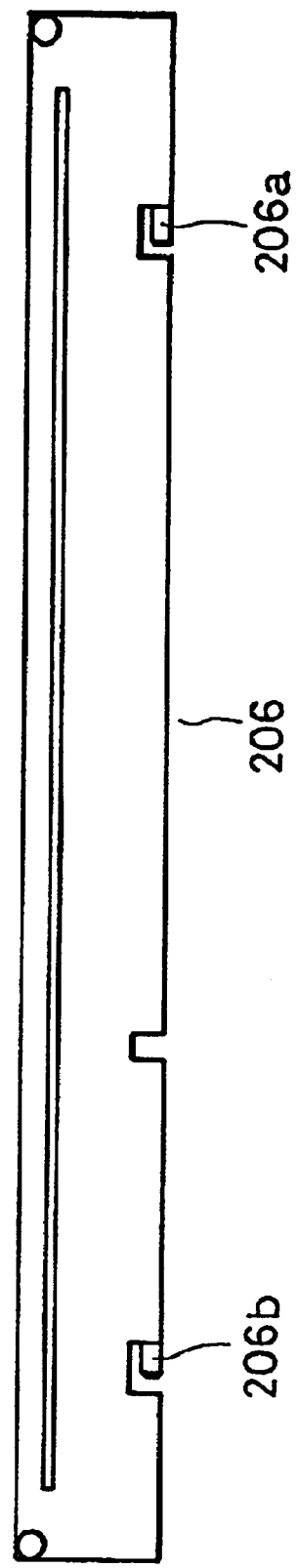
FIG. 10 illustrates the line sensor unit, in a fourth embodiment of the present invention.

FIG. 9 illustrates a third embodiment of the present invention, and FIG. 10 illustrates a fourth embodiment of the present invention.

The third embodiment differs from the above-described first and second embodiments in that the-line sensor unit 205 with shafts 205a and 205b is used. The shafts 205a and 205b are provided in a cantilever arrangement on both ends of the housing of the line sensor unit 205. The use of such a structure contributes to a reduction in cost, particularly when the housing of the line sensor unit 205 is formed by molding a resinous material such as plastic. The fourth embodiment shown in FIG. 10 differs from the above-described first to third embodiments in that a line sensor unit 206 with shafts 206a and 206b formed in a cantilever arrangement is used.

Figure 11:
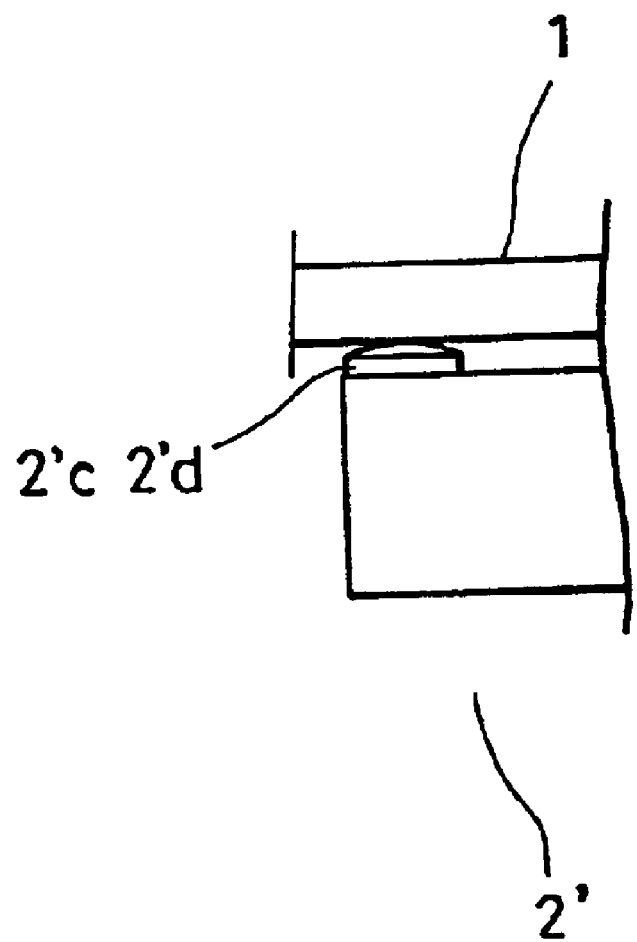
FIG. 11 illustrates the main portion of a fifth embodiment of the image reader in accordance with the present invention.

FIG. 11 illustrates the main portion of a fifth embodiment of the image reader in accordance with the present invention. The portion shown in FIG. 11 corresponds to the portion of the image reader of the first embodiment of the present invention. In the first embodiment, the line sensor unit 2 is made to contact the original-holding glass member 1 by inserting the spacers 51a and 51b into their corresponding round holes 2c and 2d in the housing of the line sensor unit 2. However, in the fifth embodiment, the line sensor unit 2 is made to contact the original-holding glass member 1 by integrally forming two protrusions 2'c and 2'd, such that they protrude from locations of the housing corresponding to the locations of the housing where the spacers 51a and 51b are provided. According to the fifth embodiment, fewer parts are required, which results in reduced costs.

Figure 12:
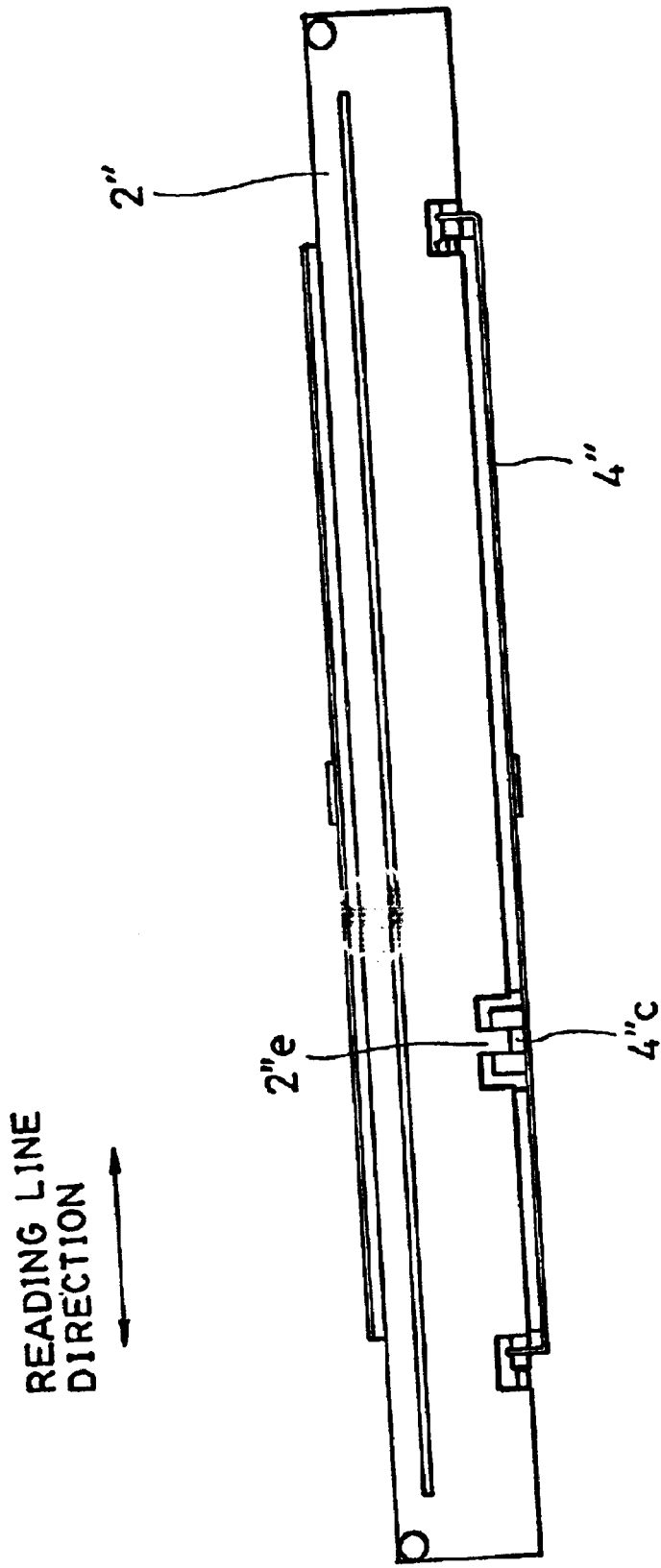
FIG. 12 illustrates the image sensor unit and the unit-holding member, in a sixth embodiment of the present invention.

FIG. 12 illustrates the image sensor unit and the unit-holding member, in a sixth embodiment of the present invention. In the first embodiment, the groove 2e, whose widthwise direction lies in the reading line direction of the line sensor unit 2, is formed in the line sensor unit 2. The groove 2e is fitted onto the protrusion 4c, whose widthwise direction also lies in the reading line direction of the line sensor unit 2, of the unit-holding member 4. However, in the sixth embodiment, a protrusion 2"e, whose widthwise direction also lies in the reading line direction of the line sensor unit 2, is formed on the line sensor unit 2. The protrusion 2"e is fitted into a groove 4"c, whose widthwise direction also lies in the reading line direction of the line sensor unit 2, of the unit-holding member 4. The protrusion 2"e is formed so that it does not protrude from the surface of the unrecessed portion of the line sensor unit 2.

Accordingly, various embodiments are possible in the present invention.

A description will now be given of a seventh embodiment of the present invention.

Figure 13:
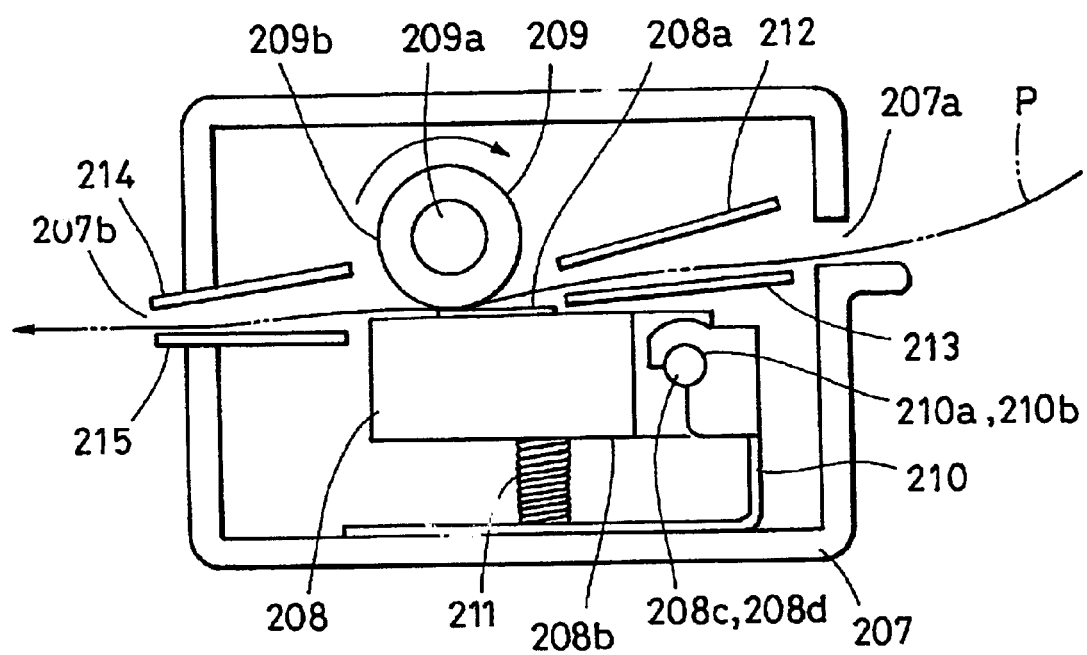
FIG. 13 is a front sectional view of a seventh embodiment of the image reader in accordance with the present invention.
Figure 14:
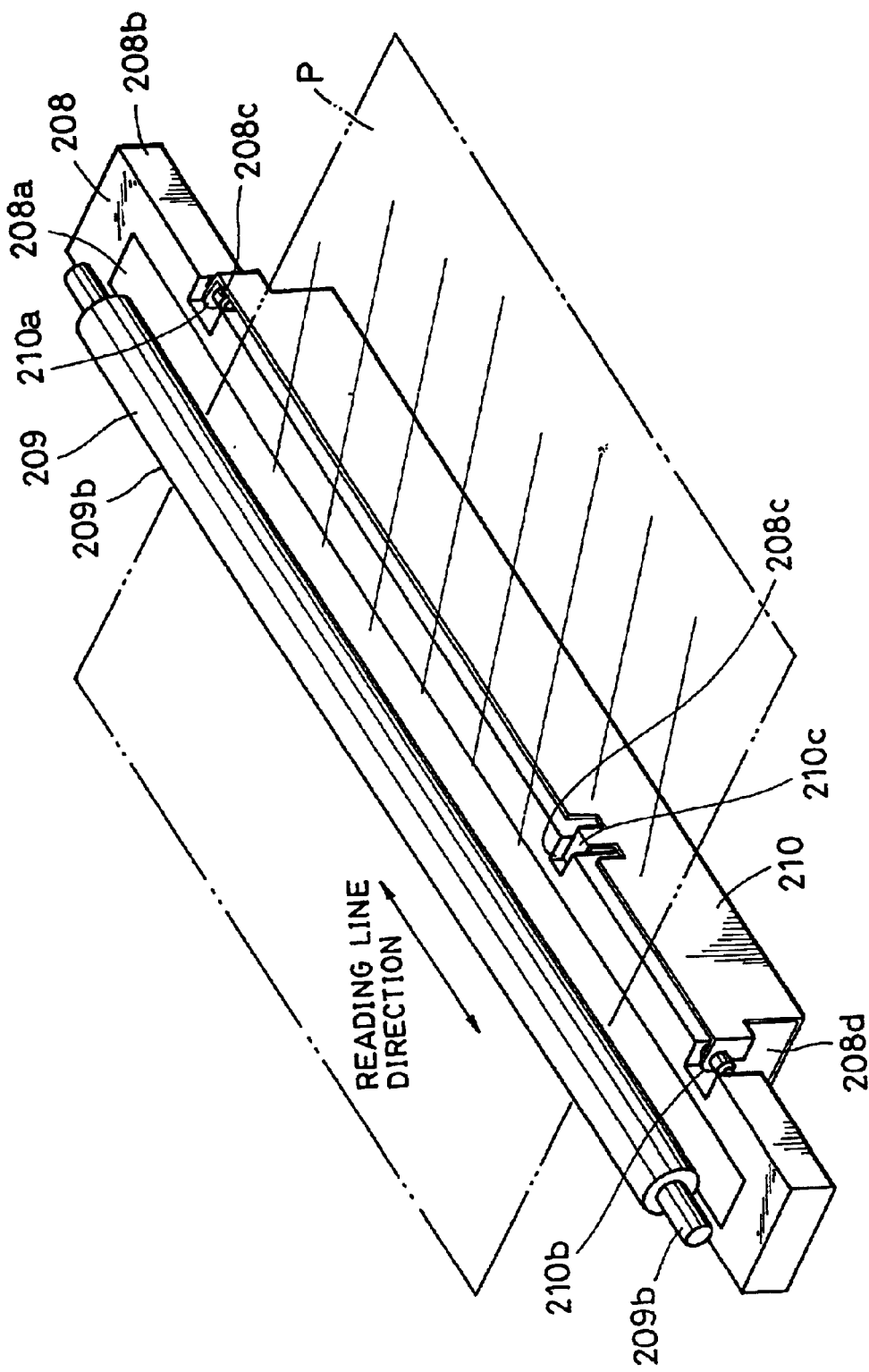
FIG. 14 is a perspective view of the main portion of the seventh embodiment of the image reader in accordance with the present invention.
Figure 15:
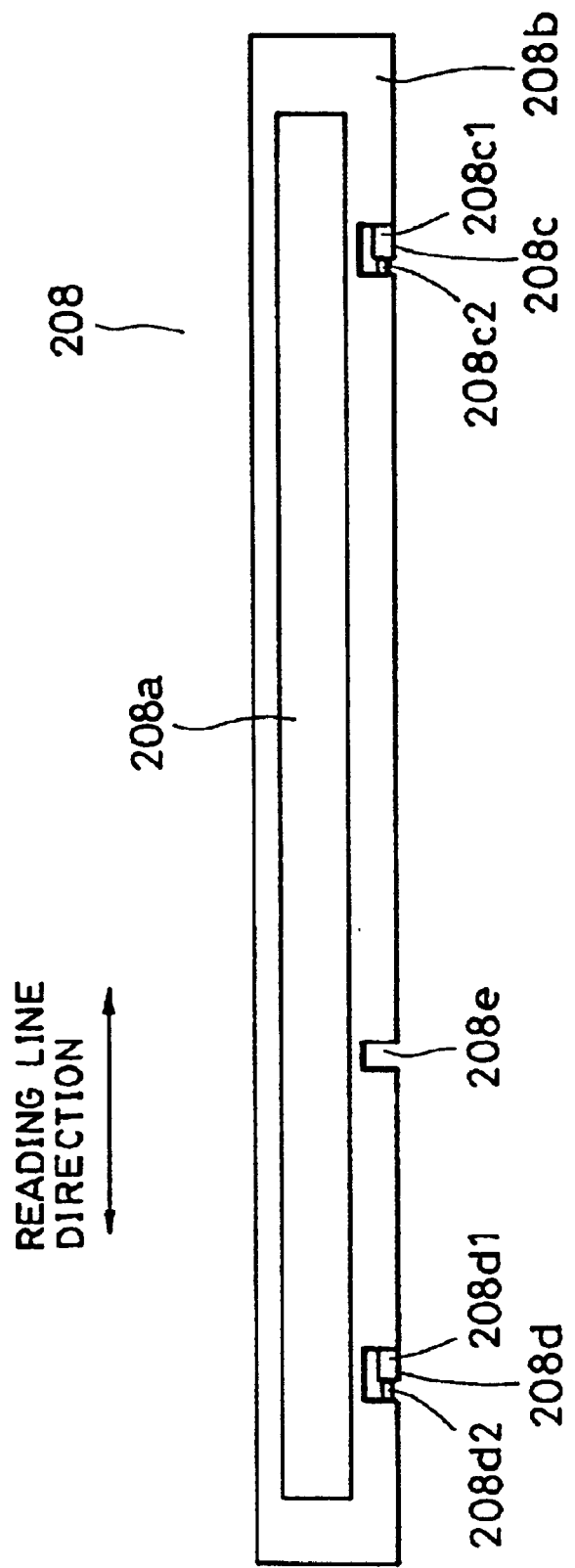
FIG. 15 illustrates the line sensor unit, in the seventh embodiment of the present invention, as viewed from the top side.
Figure 16:
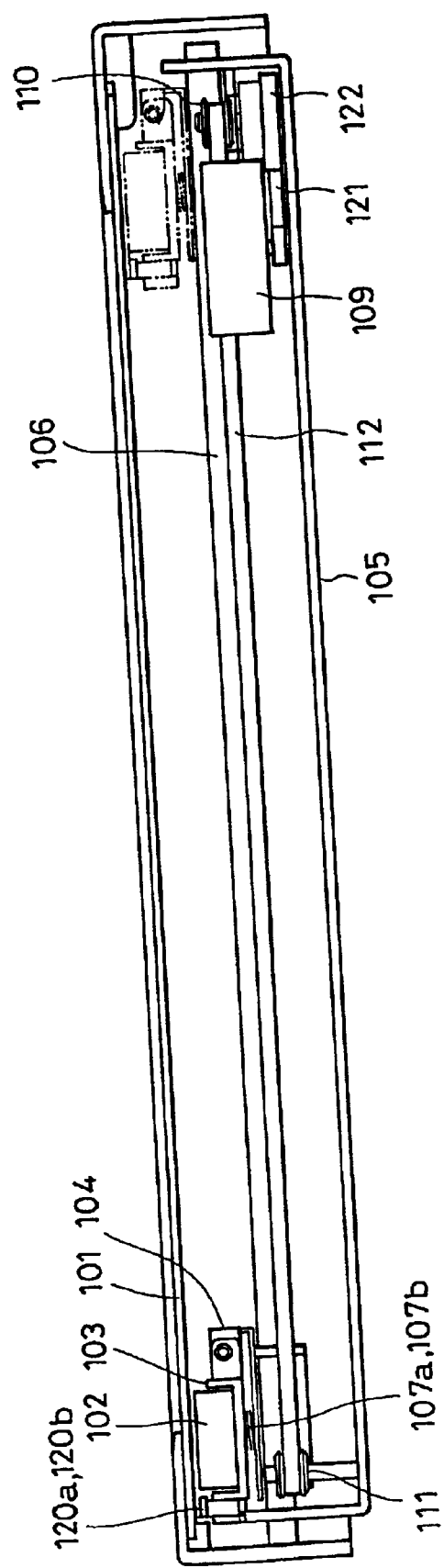
FIG. 16 is a front view of a conventional image reader.
Figure 17:
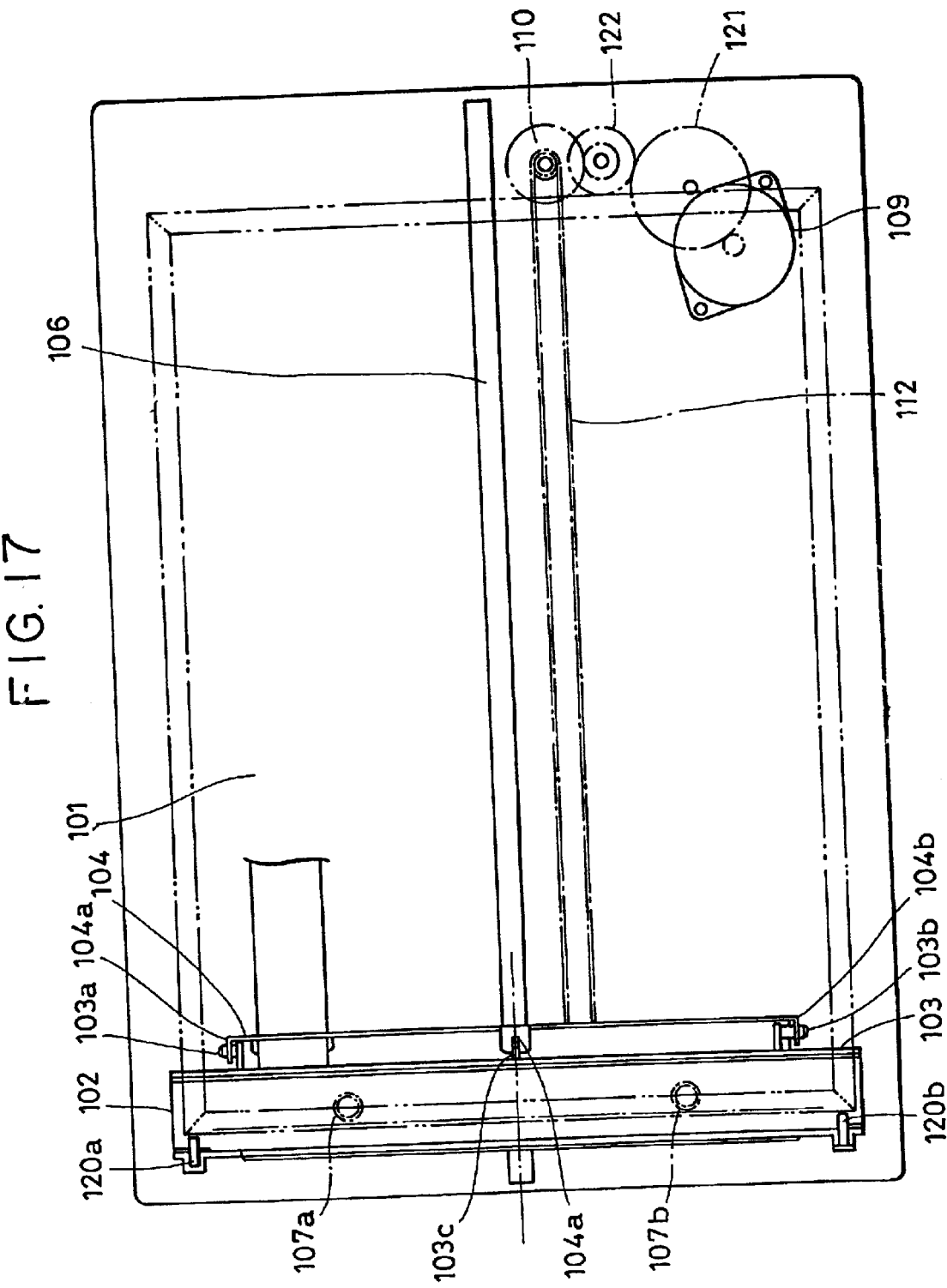
FIG. 17 illustrates the conventional image reader, as viewed from the top side.
Figure 18:
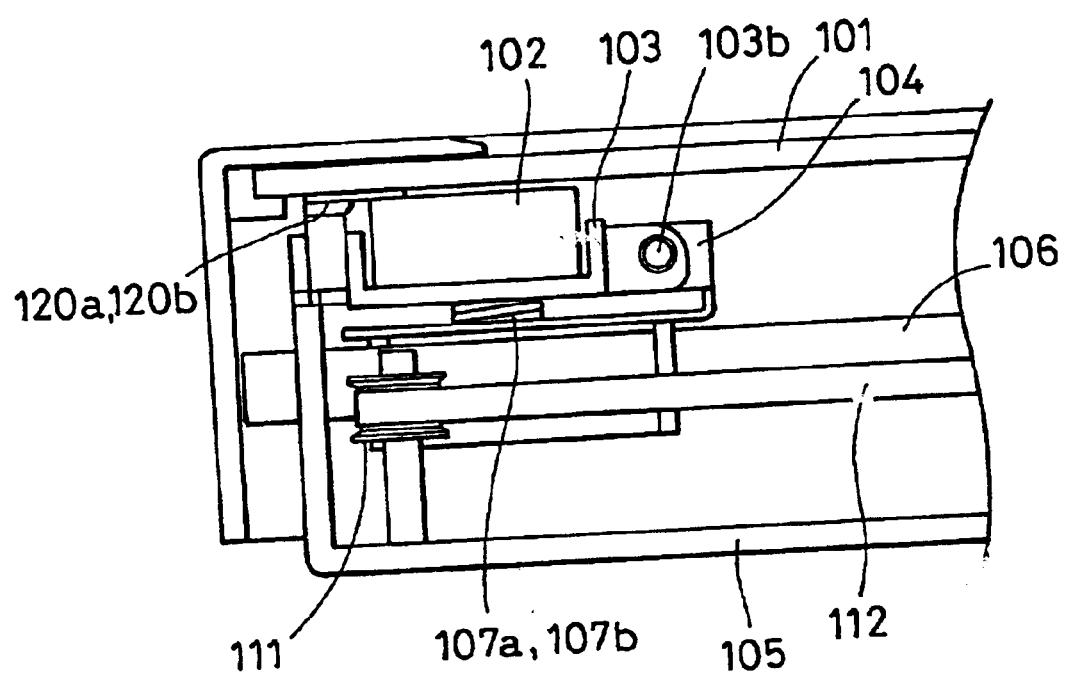
FIG. 18 is an enlarged front view of the main portion of the conventional image reader.
Figure 19:
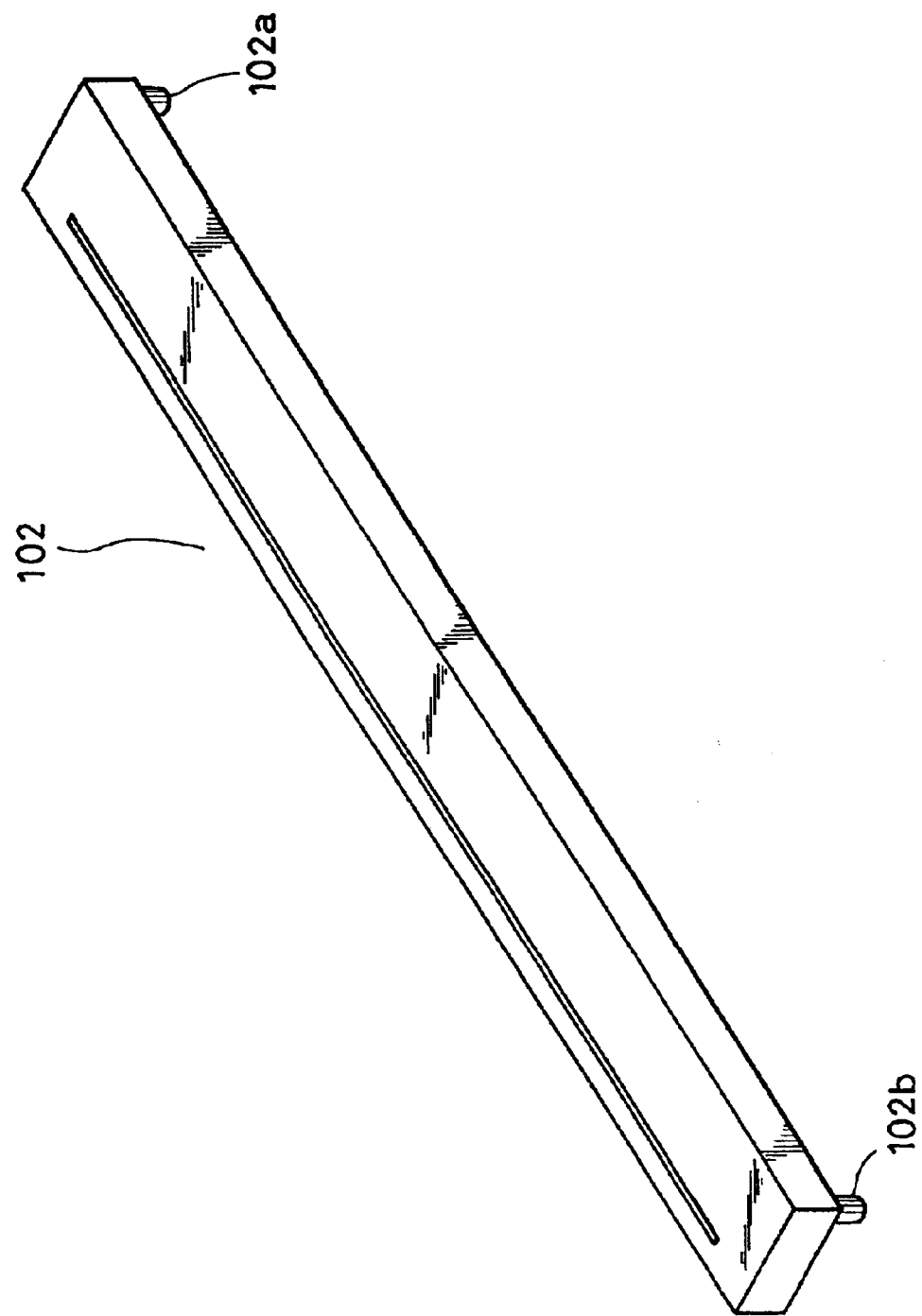
FIG. 19 illustrates the image sensor unit of the conventional reader.

In the seventh embodiment, an image scanner, which is connected to a computer or the like, for reading an image on an original is also used. In the first to sixth embodiments, an image sensor unit scans an image on the original placed on the original-holding glass member in order to read the image on the surface of the original. However, in the seventh embodiment, the original is fed into an image sensor unit through a roller or the like in order to read the image on the original surface. FIG. 13 is a front sectional view of the image reader. FIG. 14 is a perspective view of the main portion of the image reader. FIG. 15 illustrates the image sensor unit, as viewed from above the image sensor unit. In the image scanner, a line sensor unit 208, being an image sensor unit, is incorporated in a body cover 207, and a roller 209 rotates to convey an original P, in the form of a sheet, onto the line sensor unit 208 in order to read the image on the original P. The line sensor unit 208 comprises component parts that are integrally formed together into a unit. They are a light-emitting diode (LED) for illuminating an original; a selfoc lens array for forming an image using the light reflected from the original illuminated by the light-emitting diode; an image reading glass member 208a disposed at the top surface of the selfoc lens array; and an optical sensor element for converting the image formed by the selfoc lens array into electrical signals. The light-emitting diode, the selfoc lens array, and the optical sensor element are in contact with and secured, using an adhesive, to the positioning portion provided at the housing of the line sensor unit 2. The housing of the line sensor unit 2 is formed by molding a resinous material such as plastic. The reading width of the line sensor unit 208 is equal to the width of an original. The line sensor unit 208 captures a line of image information. The image reading glass member 208a is secured to a housing 208b substantially parallel to the housing 208b of the line sensor unit 2, so as to be disposed at a location which allows the image of the original, pushed against the ton surface of the image reading glass member 208a, to be formed on the optical sensor element. Two shafts 208c and 208d are formed at the housing of the line sensor unit 208, with the center line of the shafts 208c and 208d lying in a direction substantially parallel to the reading line direction (shown in FIGS. 12 and 13). The shaft 208c has a large diameter fitting portion 208c1 and a small diameter insertion portion 208c2, while the shaft 208d has a large diameter fitting portion 208d1 and a small diameter insertion portion 208d2. The shafts 208c and 208d are provided within the recessed portions in the periphery of the line sensor unit 208. The line sensor unit 208 is rotatably supported by a sensor supporting member 210, by rotatably fitting holes 210a and 210b, at both ends of the sensor supporting member 210, onto the respective fitting portions 208c1 and the 208d1 of the line-sensor unit 2. Part of the edges of the holes 210a and the 210b are cut out. A groove 208e, whose widthwise direction lies in the reading line direction, is formed in the line sensor unit 208. The groove 208e is fitted to a protrusion 210c, whose widthwise direction also lies in the reading line direction, of the sensor supporting member 210. The line sensor unit 208 and the sensor supporting member 210 are assembled in exactly the same way as the line sensor unit 2 and the unit-holding member 4 by following the steps illustrated in FIGS. 6A to 6C and FIGS. 7A and 7B. The sensor supporting table 210 is affixed to the body cover 207. The roller 209 is provided at the body cover 207 so as to be parallel to the line sensor unit 208. The roller 209 consists of a shaft portion 209a and a surface layer portion 209b affixed to the shaft portion 209a. The shaft portion 209a is made of iron, or stainless steel or the like. The surface layer portion 209b is made of rubber or foaming sponge or the like. A coil spring 211 is provided at the sensor supporting member 210. The coil spring 211 biases the line sensor unit 208 towards the roller 209, whereby the image reading line portion of the image reading member 208a of the line sensor 208 is in contact with entire image reading area of the surface layer portion 209b of the roller 209. Two guides 212 and 213, for guiding an original (in sheet form) to the line sensor 208 unit, are provided at the body cover 207. Similarly two discharge guides 214 and 215, for discharging an original, are provided at the body cover 207. The body cover 207 has an original inserting opening 207a and an original discharging opening 207b.

A description will now be given of the operation of the seventh embodiment of the present invention. The original P, in sheet form, whose image is to be read, is inserted into the original inserting opening 207a. After being inserted, the original P passes between the guides 212 and 213, and strikes the portion where the roller 209 and the line sensor unit 208 are in contact with each other. When an image reading start signal is transmitted to the image scanner from the personal computer connected to the image scanner or when it is transmitted to the image scanner as a result of pressing a scan start button (not shown) provided at the image scanner body, a stepping motor (not shown) rotates to cause rotation of the roller 209 in the direction of the arrow of FIG. 11. This causes the original P to move into the portion where the roller 209 and the line sensor unit 208 are in contact with each other, and to be conveyed towards the discharge guides 214 and 215. During this time, the line sensor unit 208 successively reads the image information of the original P. When the image on the original P, which has passed through the discharge guides 214 and 215, is discharged from the discharge opening 207b, the driving operation of the scanner is stopped, whereby the image reading operation is completed. Upon the shafts 208c and 208d as fulcra, the line sensor unit 208 is biased with respect to the roller 209 by the action of the biasing spring 211. Therefore, even when the original is in the form of a thick or thin sheet, the line sensor unit 208 follows the image on the surface of the original, so that defocusing or deterioration of the quality of the image does not occur. In addition, since parts, such as a sensor holder, are not used, the tolerance of the sensor holder can be eliminated, thereby making it possible to increase the precision of, and to reduce the size and cost of the image reader.

Although in the seventh embodiment a scanner in which an original is moved was used, the scanners in the second to sixth embodiments of the present invention may also be used.

As can be understood from the foregoing description, according to the present invention, it is possible to provide a small, high-precision, and low cost image sensor unit and image reader.

The present invention is not limited to the above-described embodiments. It also includes modifications based on the same technical ideas as those described above.

What is claimed is:

1. An image reader, comprising:
   (a) a transparent plate adapted to contact an original;
   (b) an image sensor unit including a light source adapted to illuminate the original, a reading element adapted to read an image of the original, and a housing adapted to mount said light source and said reading element, said housing being a rectangular parallelepiped and having a shaft or a bearing, said shaft or said bearing being disposed so as to be parallel to said reading element and being provided so as not to protrude from said rectangular parallelepiped;
   (c) a holding member adapted to rotatably hold said image sensor unit; and
   (d) a motor adapted to shift a positional relationship between the original and said image sensor unit held by said holding member,
   wherein said housing has a spacer which maintains a distance between said transparent plate and said image sensor unit.

2. An image reader according to claim 1, further comprising a biasing member disposed between said holding member and said image sensor unit adapted to bias said image sensor unit towards said transparent plate.

3. An image reader according to claim 1, wherein said spacer is integrally formed with said housing.

4. An image sensor unit mounted in an image reader, comprising:
   a light source adapted to illuminate an original;
   a reading element adapted to read an image of the original; and
   a housing adapted to mount said light source and said reading element, said housing having a hole mounting a spacer therein, which maintains a distance between an original-holding plate of the image reader and said image sensor unit,
   wherein said housing is movable relative to said original-holding plate in a direction perpendicular to a depth direction of said hole; and
   wherein the image reader includes a holding member adapted to rotatably hold said image sensor unit.

5. An image reading apparatus mounting said image sensor unit according to claim 4, further comprising a motor adapted to shift a positional relationship between the original and said image sensor unit.

6. An image reader, comprising:
   (a) a transparent plate adapted to contact an original;
   (b) an image sensor unit including;
      (I) a light source adapted to illuminate the original;
      (ii) a reading element adapted to read an image of the original; and
      (iii) a housing adapted to mount said light source and said reading element, wherein said housing is movable relative to said transparent plate and has a recess on a side which faces said transparent plate,
   (c) a slider engaged in said recess and adapted to contact said transparent plate;
   (d) a holding member adapted to rotatably hold said image sensor unit; and
   (e) a motor adapted to shift a positional relationship between the original and said image sensor unit held by said holding member,
   wherein said image sensor unit is driven by said motor, for scanning the original, in a direction perpendicular to a depth direction of said recess while maintaining a predetermined distance from said transparent plate by using said slider.

7. An image reader according to claim 6, further comprising a biasing member disposed between said holding member and said image sensor unit adapted to bias said image sensor unit toward said transparent plate.

8. An image reader according to claim 6, wherein said housing has a shaft or a bearing arranged so as to be parallel to said reading element.

9. An image reader according to claim 8, wherein said holding member has either a bearing or a shaft which engages with said shaft or said bearing of said housing.

10. An image reader according to claim 3, further comprising a biasing member disposed between said holding member and said image sensor unit adapted to bias said image sensor unit towards said transparent plate.

11. An image reader according to claim 1, wherein said housing further comprises a hole adapted to mount said spacer therein.

* * * * *

UNITED STATES PATENT AND TRADEMARK OFFICE
CERTIFICATE OF CORRECTION

PATENT NO. : 6,765,648 B2
DATED : July 20, 2004
INVENTOR(S) : Hiroyuki Takahara

It is certified that error appears in the above-identified patent and that said Letters Patent is hereby corrected as shown below:

Column 7,
Line 55, "ton" should read -- top --.

Signed and Sealed this

Eleventh Day of January, 2005

JON W. DUDAS
*Director of the United States Patent and Trademark Office*